US012771754B2

(12) United States Patent
Goei

(10) Patent No.: US 12,771,754 B2
(45) **Date of Patent: *Oct. 20, 2026**

(54) PEER-TO-PEER MOBILE CHARGING SERVICE NETWORK

(71) Applicant: Power Hero Corp., La Verne, CA (US)

(72) Inventor: Esmond Goei, La Verne, CA (US)

(73) Assignee: Power Hero Corp., La Verne, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 18/826,813

(22) Filed: Sep. 6, 2024

(65) Prior Publication Data

US 2025/0088567 A1 Mar. 13, 2025

Related U.S. Application Data

(63) Continuation-in-part of application No. 18/443,617, filed on Feb. 16, 2024, now Pat. No. 12,188,778.

(60) Provisional application No. 63/664,042, filed on Jun. 25, 2024, provisional application No. 63/581,450, filed on Sep. 8, 2023.

(51) Int. Cl.
*G06F 15/16* (2006.01)
*H04L 67/104* (2022.01)
*H04L 67/51* (2022.01)

(52) U.S. Cl.
CPC ............ *H04L 67/51* (2022.05); *H04L 67/104* (2013.01)

(58) Field of Classification Search
CPC .............................. H04L 67/51; H04L 67/104
USPC .................................. 709/200–203, 217–227
See application file for complete search history.

(56) References Cited

U.S. PATENT DOCUMENTS

| | | | |
|---|---|---|---|
| 5,711,648 | A | 1/1998 | Hammerslag |
| 5,857,155 | A | 1/1999 | Hill et al. |
| 6,854,642 | B2 | 2/2005 | Metcalf et al. |
| 6,941,197 | B1 | 9/2005 | Murakami et al. |
| 7,076,468 | B2 | 7/2006 | Hillegass et al. |

(Continued)

FOREIGN PATENT DOCUMENTS

JP 2010230615 A 10/2010

OTHER PUBLICATIONS

Australian Patent Office: Examination Report No. 1 of AU 2024278144 (related application); Behzad Vafa; Mar. 25, 2025; 5 pages.

(Continued)

*Primary Examiner* — Moustafa M Meky

(57) ABSTRACT

A system for providing peer-to-peer mobile charging services includes a database for storing subscriber data relating to subscribers registered with the system and mobile power platform data relating to register mobile power platforms for energizing electrical/electronic devices. A server provides a peer-to-peer mobile charging services system. The server is configured to receive a request for a service from a subscriber, select a registered mobile power platform to match with the subscriber using the peer-to-peer mobile charging services system responsive to receipt of the request from the subscriber, transmit data regarding the selected registered mobile power platform to the subscriber. A network interface connects the server to a network for receiving the mobile power platform data and the request for service.

39 Claims, 4 Drawing Sheets

(56) References Cited

U.S. PATENT DOCUMENTS 7,521,138 B2 4/2009 Pearson
7,657,763 B2 2/2010 Nelson et al.
7,742,776 B2 6/2010 Annunziato et al.
7,804,274 B2 9/2010 Baxter et al.
7,827,057 B1 11/2010 Walker et al.
7,906,937 B2 3/2011 Bhade et al.
7,952,325 B2 5/2011 Baxter et al.
7,986,126 B1 7/2011 Bucci et al.
8,013,570 B2 9/2011 Baxter et al.
8,072,184 B2 12/2011 Bhade et al.
8,102,248 B2 1/2012 Yasuda et al.
8,143,842 B2 3/2012 Tyler et al.
8,198,859 B2 6/2012 Tyler et al.
8,258,743 B2 9/2012 Tyler et al.
8,305,032 B2 11/2012 McKenna
8,350,526 B2 1/2013 Dyer et al.
8,359,126 B2 1/2013 Tate, Jr. et al.
8,384,347 B2 2/2013 Thomas et al.
8,487,584 B2 7/2013 Taylor-Haw et al.
8,502,500 B2 8/2013 Baxter et al.
8,509,976 B2 8/2013 Kempton
8,513,917 B2 8/2013 Gomi et al.
8,564,403 B2 10/2013 Landau-Holdsworth et al.
8,577,528 B2 11/2013 Uyeki
8,595,122 B2 11/2013 Karner et al.
8,698,642 B2 4/2014 Taguchi
8,700,456 B2 4/2014 Walker et al.
8,710,372 B2 4/2014 Karner
8,816,879 B2 8/2014 Stefik et al.
8,849,687 B2 9/2014 Hakim et al.
8,872,379 B2 10/2014 Ruiz et al.
8,914,638 B2 12/2014 Kawamoto et al.
8,965,669 B2 2/2015 Fisher et al.
8,983,875 B2 3/2015 Shelton et al.
9,013,283 B1 4/2015 Tackaberry
9,026,347 B2 5/2015 Gadh et al.
9,043,038 B2 5/2015 Kempton
9,085,241 B2 7/2015 Asano et al.
9,121,718 B2 9/2015 Uyeki et al.
9,153,847 B2 10/2015 Harty
9,179,558 B1 11/2015 Limber et al.
9,283,857 B2 3/2016 Shelton et al.
9,358,894 B2 6/2016 Shelton et al.
9,367,108 B2 6/2016 Asghari et al.
9,418,345 B1 8/2016 Meehan et al.
9,442,548 B1 9/2016 Johansson et al.
9,452,684 B2 9/2016 Shelton et al.
9,476,725 B2 * 10/2016 Fisher ................ G01C 21/3484
9,496,736 B1 11/2016 Johansson et al.
9,505,314 B2 11/2016 Widmer et al.
9,610,853 B1 4/2017 Miller et al.
9,647,474 B2 5/2017 Fathollahi et al.
9,697,553 B2 7/2017 Walker et al.
9,715,780 B2 7/2017 Garrison et al.
9,754,300 B2 9/2017 Kempton et al.
9,779,365 B2 10/2017 Smullin et al.
9,796,280 B2 10/2017 Mccool et al.
9,872,226 B2 1/2018 Hasegawa et al.
9,886,813 B2 * 2/2018 Han .................... H04L 65/1073
9,929,577 B2 3/2018 Fathollahi et al.
10,084,329 B2 9/2018 Hamilton et al.
10,141,694 B2 11/2018 Geo
10,161,759 B2 12/2018 Fisher et al.
10,275,797 B2 4/2019 Freytag
10,279,697 B2 5/2019 Uyeki
10,283,984 B2 5/2019 Maguire et al.
10,286,792 B2 5/2019 Shelton et al.
10,312,700 B2 6/2019 Roberts
10,348,092 B1 7/2019 Diaz
10,354,301 B2 7/2019 Chang et al.
10,355,503 B2 7/2019 Fathollahi et al.
10,377,256 B2 8/2019 Nishida
10,410,250 B2 9/2019 Singhal et al.
10,430,833 B2 10/2019 Newman
10,434,892 B2 10/2019 Ko
10,467,833 B1 * 11/2019 Beggs ................ G06Q 20/3224
10,515,390 B2 12/2019 Pouliot
10,586,254 B2 3/2020 Singhal
10,661,678 B2 5/2020 Vidhi et al.
10,673,258 B2 6/2020 Kemppainen et al.
10,682,922 B2 6/2020 Shelton et al.
10,699,305 B2 6/2020 Ricci
10,723,230 B2 7/2020 Mastrandrea
10,857,902 B2 12/2020 Goei et al.
10,859,390 B2 12/2020 Fisher et al.
10,899,235 B2 1/2021 Forbes, Jr. et al.
10,949,885 B2 3/2021 Xiao et al.
10,960,782 B2 3/2021 Goei
10,970,746 B2 4/2021 Singhal et al.
10,985,585 B2 * 4/2021 Hsieh ...................... B60L 53/68
11,017,615 B2 5/2021 Kimura
11,052,778 B2 7/2021 McCool et al.
11,107,352 B2 * 8/2021 Ramot ..................... G06N 5/04
11,168,995 B2 * 11/2021 Ludwick ................ B60L 53/67
11,180,041 B2 11/2021 Nishida
11,235,681 B2 2/2022 Vidhi et al.
11,305,660 B2 * 4/2022 Stöcker ................... B60L 53/65
11,366,470 B2 * 6/2022 Panigrahi ................ B60L 53/68
11,413,982 B2 8/2022 Goei
11,420,528 B2 8/2022 Kemppainen et al.
11,584,240 B2 * 2/2023 Chase ................... B60L 53/126
11,830,363 B2 11/2023 Ramot et al.
11,892,310 B2 2/2024 Fagenson
11,907,978 B2 * 2/2024 Shih ................... G06Q 30/0601
11,959,759 B2 * 4/2024 Ludwick ................ B60L 53/67
12,172,541 B2 * 12/2024 Wang .................... B60L 53/665
12,447,847 B2 * 10/2025 Ehrenhalt .............. B25J 11/008
12,570,167 B2 3/2026 Chase et al.
2002/0010681 A1 1/2002 Hillegass et al.
2002/0095487 A1 7/2002 Day et al.
2002/0173924 A1 11/2002 Lin
2003/0150907 A1 8/2003 Metcalf et al.
2003/0178487 A1 9/2003 Rogers
2004/0078276 A1 4/2004 Shimogori
2005/0139649 A1 6/2005 Metcalf et al.
2005/0246436 A1 11/2005 Day et al.
2006/0181243 A1 8/2006 Graves et al.
2006/0190409 A1 8/2006 Hillegass et al.
2007/0112622 A1 5/2007 Meggs
2007/0150355 A1 6/2007 Meggs
2007/0155349 A1 7/2007 Nelson et al.
2007/0282495 A1 12/2007 Kempton et al.
2008/0007210 A1 1/2008 Butler
2008/0262920 A1 10/2008 O'Neill et al.
2008/0281663 A1 11/2008 Hakim et al.
2009/0164152 A1 6/2009 Creus et al.
2009/0251300 A1 * 10/2009 Yasuda ................... B60L 53/65
340/5.2
2010/0013433 A1 1/2010 Baxter et al.
2010/0013434 A1 1/2010 Taylor-Haw et al.
2010/0017045 A1 1/2010 Nesler et al.
2010/0114800 A1 5/2010 Yasuda et al.
2010/0134067 A1 6/2010 Baxter et al.
2010/0141203 A1 6/2010 Graziano et al.
2010/0141204 A1 6/2010 Tyler et al.
2010/0141205 A1 6/2010 Tyler et al.
2010/0145535 A1 6/2010 Tyler et al.
2010/0145540 A1 6/2010 McKenna
2010/0145885 A1 6/2010 Graziano et al.
2010/0204865 A1 8/2010 Nakamura
2010/0211643 A1 8/2010 Lowenthal et al.
2010/0231164 A1 9/2010 Yang
2010/0237985 A1 9/2010 Landau-Holdsworth et al.
2010/0280675 A1 11/2010 Tate, Jr. et al.
2010/0280678 A1 11/2010 Tate, Jr. et al.
2010/0292877 A1 11/2010 Lee
2010/0306033 A1 12/2010 Oved et al.
2010/0320966 A1 12/2010 Baxter et al.
2011/0032110 A1 2/2011 Taguchi
2011/0047022 A1 2/2011 Walker et al.
2011/0057612 A1 3/2011 Taguchi et al.
2011/0068738 A1 3/2011 Gomi et al.
2011/0095723 A1 4/2011 Bhade et al.
2011/0183733 A1 7/2011 Yoshida et al.

(56) References Cited

U.S. PATENT DOCUMENTS

2011/0184575 A1 7/2011 Kawamoto et al.
2011/0184580 A1 7/2011 Kawamoto et al.
2011/0184585 A1 7/2011 Matsuda et al.
2011/0185196 A1 7/2011 Asano et al.
2011/0185198 A1 7/2011 Ukita et al.
2011/0191265 A1 8/2011 Lowenthal et al.
2011/0202192 A1 8/2011 Kempton
2011/0202217 A1 8/2011 Kempton
2011/0202418 A1 8/2011 Kempton et al.
2011/0204720 A1 8/2011 Ruiz et al.
2011/0316479 A1 12/2011 Baxter et al.
2011/0316482 A1 12/2011 Baxter et al.
2011/0320593 A1 12/2011 Takami et al.
2012/0016546 A1 1/2012 Nilssen et al.
2012/0019215 A1 1/2012 Wenger et al.
2012/0043935 A1 2/2012 Dyer et al.
2012/0106672 A1 5/2012 Shelton et al.
2012/0109401 A1 5/2012 Shelton et al.
2012/0109402 A1 5/2012 Shelton et al.
2012/0109403 A1 5/2012 Shelton et al.
2012/0109519 A1 5/2012 Uyeki
2012/0109797 A1 5/2012 Shelton et al.
2012/0109798 A1 5/2012 Shelton et al.
2012/0123670 A1 5/2012 Uyeki
2012/0133325 A1 5/2012 Thomas et al.
2012/0173074 A1 7/2012 Yasko et al.
2012/0193929 A1 8/2012 Karner
2012/0197693 A1 8/2012 Karner et al.
2012/0197791 A1 8/2012 Karner et al.
2012/0200260 A1 8/2012 Karner et al.
2012/0232981 A1 9/2012 Torossian et al.
2012/0249065 A1 10/2012 Bissonette et al.
2012/0268245 A1 10/2012 Alexander et al.
2012/0286730 A1 11/2012 Bonny
2013/0002207 A1 1/2013 Wenger
2013/0038286 A1 2/2013 Thomas et al.
2013/0057883 A1 3/2013 Ohshima et al.
2013/0096995 A1* 4/2013 Rosalik, Jr. ............ G06Q 50/06
705/14.1
2013/0110632 A1 5/2013 Theurer et al.
2013/0113413 A1 5/2013 Harty
2013/0124320 A1 5/2013 Karner
2013/0127416 A1 5/2013 Karner et al.
2013/0127417 A1 5/2013 Karner et al.
2013/0151293 A1 6/2013 Karner et al.
2013/0176000 A1 7/2013 Bishop et al.
2013/0179057 A1 7/2013 Fisher et al.
2013/0179061 A1 7/2013 Gadh et al.
2013/0307382 A1 11/2013 Garrison et al.
2013/0307466 A1 11/2013 Frisch et al.
2013/0339072 A1 12/2013 Touge
2014/0002018 A1 1/2014 Montemayor Cavazos et al.
2014/0005852 A1 1/2014 Asghari et al.
2014/0021908 A1 1/2014 McCool et al.
2014/0028257 A1 1/2014 Nishida
2014/0046707 A1 2/2014 Hama
2014/0089016 A1 3/2014 Smullin et al.
2014/0139354 A1 5/2014 Miyazaki
2014/0167694 A1 6/2014 Gjinali et al.
2014/0222609 A1 8/2014 Walker et al.
2014/0232338 A1 8/2014 Fontana et al.
2014/0244375 A1 8/2014 Kim
2014/0258457 A1* 9/2014 Han ...................... G07F 15/003
709/217
2014/0266046 A1 9/2014 Baxter et al.
2014/0324737 A1 10/2014 Serrano
2014/0330764 A1 11/2014 Rhines et al.
2015/0032529 A1 1/2015 Diachenko
2015/0042168 A1 2/2015 Widmer et al.
2015/0066224 A1 3/2015 Uyeki
2015/0073631 A1 3/2015 Lim et al.
2015/0074994 A1 3/2015 Maenishi et al.
2015/0127248 A1 5/2015 Fisher et al.
2015/0160672 A1 6/2015 Hakim et al.
2015/0162867 A1 6/2015 Meringer
2015/0183333 A1 7/2015 Forbes, Jr. et al.
2015/0194833 A1 7/2015 Fathollahi et al.
2015/0224888 A1 8/2015 Wild et al.
2015/0249353 A1 9/2015 Hamilton et al.
2015/0303692 A1 10/2015 Spotti
2015/0306967 A1 10/2015 Cohen
2015/0356587 A1 12/2015 Mokwunye
2016/0082856 A1 3/2016 Baxter et al.
2016/0098770 A1 4/2016 Chang et al.
2016/0099590 A1 4/2016 Velderman et al.
2016/0254698 A1 9/2016 Anderson
2017/0010114 A1 1/2017 Fisher et al.
2017/0013369 A1 1/2017 Renken et al.
2017/0033579 A1 2/2017 Maguire et al.
2017/0087999 A1 3/2017 Miller et al.
2017/0088001 A1 3/2017 Haas et al.
2017/0214245 A1 7/2017 Nazarian
2017/0214263 A1 7/2017 Fathollahi et al.
2017/0238238 A1 8/2017 Hasegawa et al.
2017/0246960 A1 8/2017 Kim
2017/0282736 A1 10/2017 Goei
2018/0026404 A1 1/2018 Geo
2018/0034271 A1 2/2018 Lam
2018/0034299 A1 2/2018 Seman, Jr. et al.
2018/0065494 A1 3/2018 Mastrandrea
2018/0141544 A1 5/2018 Xiao et al.
2018/0141545 A1 5/2018 Freytag
2018/0141562 A1 5/2018 Singhal
2018/0141568 A1 5/2018 Singhal et al.
2018/0143035 A1 5/2018 Ricci
2018/0143298 A1 5/2018 Newman
2018/0143639 A1 5/2018 Singhal et al.
2018/0144369 A1 5/2018 Pouliot
2018/0170207 A1 6/2018 Ko
2018/0202825 A1 7/2018 You et al.
2018/0241228 A1 8/2018 Kemppainen et al.
2018/0272874 A1 9/2018 McCool et al.
2018/0272886 A1 9/2018 Stöcker et al.
2018/0307226 A1* 10/2018 Chase ................... B60L 53/126
2018/0375353 A1 12/2018 Fathollahi et al.
2019/0006862 A1 1/2019 Hamilton, IV et al.
2019/0107406 A1 4/2019 Cox et al.
2019/0226860 A1 7/2019 Fisher et al.
2019/0248439 A1 8/2019 Wang
2019/0255963 A1 8/2019 Goei
2019/0263281 A1 8/2019 Wang
2019/0280502 A1 9/2019 Hsieh et al.
2019/0285425 A1 9/2019 Ludwick et al.
2019/0308517 A1 10/2019 Nishida
2019/0351783 A1 11/2019 Goei
2020/0003571 A1* 1/2020 Shirakawa ............. G06Q 50/10
2020/0094691 A1 3/2020 Vidhi et al.
2020/0160476 A1 5/2020 Ramot et al.
2020/0160477 A1 5/2020 Ramot et al.
2020/0160478 A1 5/2020 Ramot et al.
2020/0160709 A1 5/2020 Ramot et al.
2020/0269721 A1 8/2020 Vidhi et al.
2020/0295576 A1 9/2020 Kemppainen et al.
2020/0307398 A1 10/2020 Shelton et al.
2021/0078434 A1 3/2021 Goei et al.
2021/0080282 A1 3/2021 Goei
2021/0096564 A1* 4/2021 Panigrahi ................ B60L 53/68
2021/0142411 A1 5/2021 Forbes, Jr. et al.
2021/0182911 A1 6/2021 Xiao et al.
2021/0197682 A1 7/2021 Goei
2021/0201357 A1 7/2021 Singhal et al.
2021/0394631 A1 12/2021 McCool et al.
2021/0394632 A1 12/2021 McCool et al.
2022/0074750 A1 3/2022 Ludwick et al.
2022/0111747 A1 4/2022 Goei et al.
2022/0153156 A1 5/2022 Goei et al.
2022/0242267 A1* 8/2022 Wang ...................... B60L 53/65
2022/0258632 A1 8/2022 Ehrenhalt
2022/0277366 A1 9/2022 Shih et al.
2022/0299330 A1* 9/2022 Fagenson ........... G06Q 30/0237
2022/0305946 A1* 9/2022 Kitamoto .............. B60L 53/665
2022/0332210 A1 10/2022 Goei
2022/0340036 A1* 10/2022 Liou ...................... G06Q 50/40

(56) References Cited

U.S. PATENT DOCUMENTS

| | | | | |
|---|---|---|---|---|
| 2023/0229913 | A1 * | 7/2023 | Zhang | G06Q 50/06 706/25 |
| 2023/0264593 | A1 * | 8/2023 | Jasti | G06Q 10/02 320/109 |
| 2024/0010087 | A1 * | 1/2024 | Atlasman | B60L 53/305 |
| 2024/0210190 | A1 | 6/2024 | Fagenson | |

OTHER PUBLICATIONS

Australian Patent Office: Examination Report of AU 2022256221 (related application); Sep. 7, 2023; 3 pages.
Australian Patent Office: First Examination Report of AU 2017308799 (related application); Nov. 2, 2021; 4 pages.
Australian Patent Office: Notice of acceptance for patent application of AU 2022256221 (related application); Aug. 23, 2024; 3 pages.
Canadian Intellectual Property Office: Examination Report of CA 3019622 (related application); Halloran, Bill; Nov. 16, 2023; 4 pages.
Canadian Intellectual Property Office: Examiners Report of Canadian Application 3019622 (related application); Bill Halloran; Mar. 14, 2023; 7 pages.
Canadian Intellectual Property Office: Examiners Report of Canadian Application 3019622 (related application); Bill Halloran; Mar. 28, 2024; 4 pages.
Patent Cooperation Treaty: International Preliminary Report on Patentability of PCT/US20/62182 (related application); Athina Nickitas-Etienne; May 17, 2022; 10 pages.
PCT: International Search Report and Written Opinion of PCT/US20/62182 (related application); Feb. 24, 2021; 12 pgs.
Rowe et al. "Sensor Andrew: Large-scale campus-wide sensing and actuation." In: IBM Journal of Research and Development. Mar. 2011 (Mar. 2011) Retrieved on Jan. 23, 2021.
Canadian Intellectual Property Office: Examiners Report of Canadian Application 3,160,842 (related application); Mahamed Guled; Jan. 6, 2026; 6 pages.

* cited by examiner

PEER-TO-PEER MOBILE CHARGING SERVICE NETWORK

CROSS-REFERENCE TO RELATED APPLICATIONS

This application claims benefit of U.S. Provisional Application No. 63/581,450, filed Sep. 8, 2023, entitled PEER-TO-PEER MOBILE CHARGING SERVICE NETWORK and U.S. Provisional Application No. 63/664,042, filed Jun. 25, 2024, entitled PEER-TO-PEER DEVICE CHARGING SERVICE NETWORK, the specifications of which are incorporated by reference herein in their entirety.

This application is a continuation in part of U.S. patent application Ser. No. 18/443,617, filed Feb. 16, 2024, entitled A UNIVERSAL AUTOMATED SYSTEM FOR IDENTIFYING, REGISTERING AND VERIFYING THE EXISTENCE, LOCATION AND CHARACTERISTICS OF ELECTRIC AND OTHER POWER OUTLETS BY RANDOM USERS AND FOR RETRIEVAL AND UTILIZATION OF SUCH PARAMETRIC DATA AND OUTLETS BY ALL USERS, the specification of which is incorporated by reference herein in its entirety.

TECHNICAL FIELD

This invention relates the charging of electric/electronic devices and electric vehicles, and more particularly to a peer-to-peer network for providing mobile charging services to electric/electronic devices and electric vehicles.

BACKGROUND

Users of a battery-powered electric/electronic devices such as laptop computers, tablets, mobile phones, portable oxygen breathing equipment, electric wheelchairs, electric scooters or electric skateboards experienced bouts of anxiety and fear of running out of power for their electrical or electronic (electrical/electronic) device. Particularly today, it is reported that 93% of students use smart phones and laptops. Such students generally have a need throughout the day to charge their devices and it would be useful if they could easily locate a charging source where they can charge their electronic or electric device. At times, there may not be an outlet available or accessible that is connected to the electric grid or power generator which provides power to the outlet wherein it would be useful if the device user could charge their devices from a mobile power provider. Such a mobile power provider may just be an individual or an autonomous mobile platform that is capable of recharging the user's device.

A similar issue is experienced by electric vehicle (EV) drivers that may be anxious about running out of battery charge for their vehicle, so-called "range anxiety" and their anxiety is heightened by the lack of EV chargers and availability for use when needed. While pundits claim that large batteries will negate such issues, the fact is that regardless of the energy capacity of an onboard EV battery, EV drivers will occasionally still run out of battery charge. Even present-day long-range internal-combustion-engine (ICE) powered automobiles will still run out of liquid fuel and that has led to the proliferation of emergency roadside assistance organizations like the American Automobile Association (AAA) that renders roadside assistance such as providing gasoline, battery boosting and/or towing.

EVs are at a disadvantage when they run out of onboard battery charge as there are few emergency roadside assistance providers that provide on the spot battery recharging. In addition, EVs are typically much heavier than internal combustion vehicles due to the weight of the EV's onboard battery, typically by several thousand pounds. Thus, an EV that runs out of battery charge will be harder to push to the side of the road when it runs out of power, a matter of great inconvenience and danger.

SUMMARY

The present invention, as disclosed and described herein, in one aspect thereof comprises a system for providing peer-to-peer mobile charging services includes a database for storing subscriber data relating to subscribers registered with the system and mobile power platform data relating to register mobile power platforms for energizing electrical/electronic devices. A server provides a peer-to-peer mobile charging services system. The server is configured to receive a request for a service from a subscriber, select a registered mobile power platform to match with the subscriber using the peer-to-peer mobile charging services system responsive to receipt of the request from the subscriber, transmit data regarding the selected registered mobile power platform to the subscriber. A network interface connects the server to a network for receiving the mobile power platform data and the request for service.

BRIEF DESCRIPTION OF THE DRAWINGS

For a more complete understanding, reference is now made to the following description taken in conjunction with the accompanying Drawings in which.

DETAILED DESCRIPTION

Figure 1:
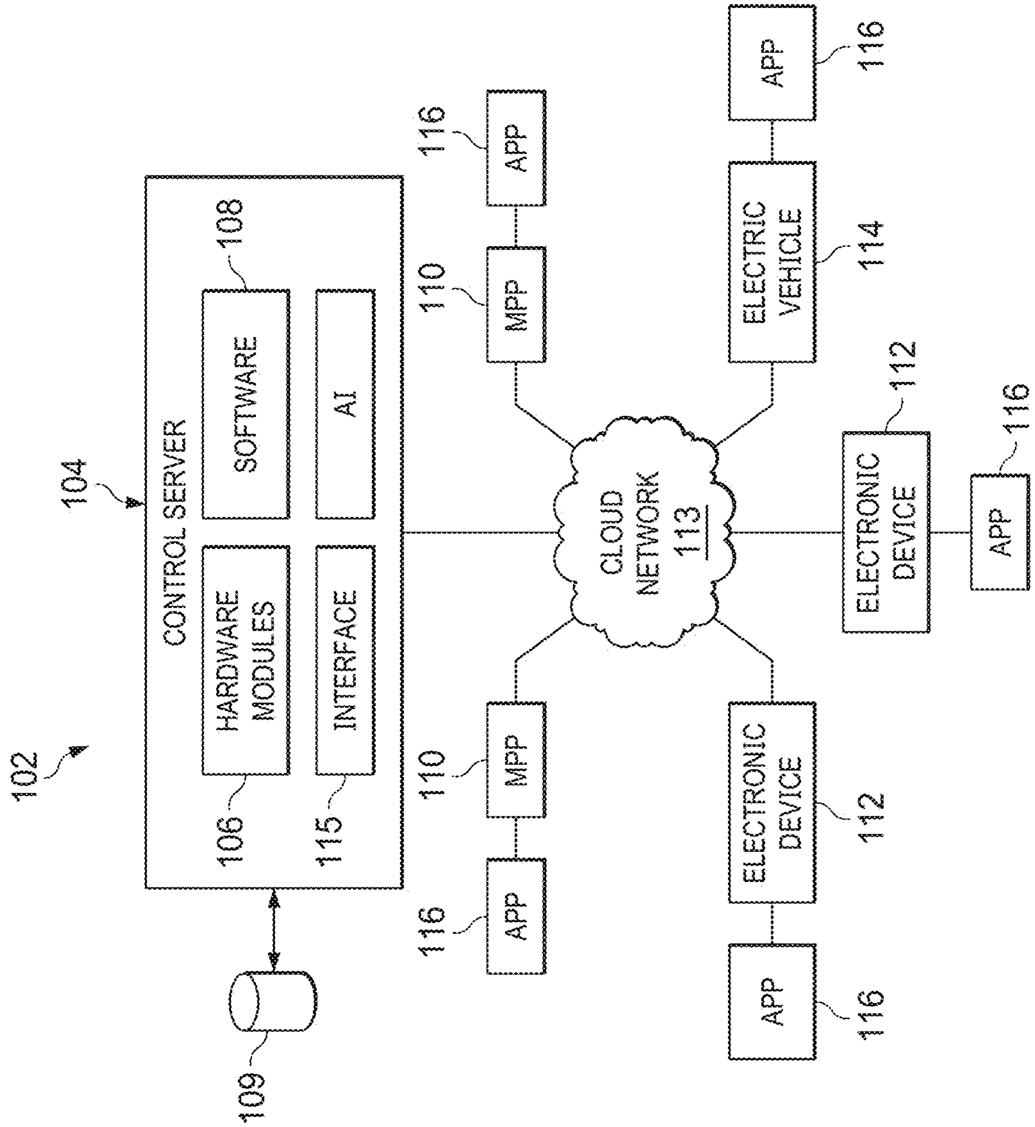
FIG. 1 illustrates a block diagram of a peer-to-peer mobile charging service network

Referring now to the drawings, wherein like reference numbers are used herein to designate like elements throughout, the various views and embodiments of peer-to-peer mobile charging network are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a block diagram of a peer-to-peer mobile charging network 102. The network 102 enables for rapid scaling of the availability of emergency device charging services by network individuals, and even enables organizations to operate as mobile power providers (MPPs) 110 providing charging services. The network 102 enables the matching of device users with an individual or autonomous mobile platform equipped with like devices respectively or portable, transportable battery packs or a portable generator such as a portable wind or solar power generator, collectively referred to as power devices. Such power device equipped autonomous mobile platforms, MPPs or individuals can provide mobile charging services to device users in need of a charge.

Anyone with a power device may become a roving mobile power provider by registering with the peer-to-peer mobile charging service server 104 that implements a peer-to-peer mobile charging service system. The peer-to-peer mobile charging service server 104 incorporates operating hardware modules 106 and software 108 for performing the described peer-to-peer mobile charging service system operations. The server 104 is under control of an administrator of the peer-to-peer charging service system who controls the settings of the various parameters and protocols such as the protocol for arbitering which MPP 110 gets to accept a charge request. The peer-to-peer mobile charging service server 104 will contact mobile power providers (MPPs) 110 that are registered on the server 104 to provide emergency recharging services to an electric/electronic device 112 or electric vehicle 114 via a service software application 116 that is associated with the electric/electronic device 112 or electric vehicle 114. In some cases, the MPPs 110 may also receive charging. The peer-to-peer mobile service charging server 104 facilitates matching between user devices in need of charging, or other services with mobile power providers 110 that provide the power or service. It will be understood that the services provided by the peer-to-peer mobile charging service server 104 need not be restricted to the provision of charging of the onboard battery of a battery-powered device or electric vehicle and may encompass the provision of other services such as food and refreshments.

With respect to the peer-to-peer mobile charging service server 104 being used for EV charging, the system may use as the transport mechanism for the mobile power providers 110 vehicles that are used in ridesharing services. Such ridesharing services may be equipped with battery packs that can discharge power to charge electric vehicles in need of recharging. Such ridesharing vehicles may also use a propulsion mechanism that is fueled by hydrogen or even internal combustion engine vehicles and may use their onboard propulsion system to generate electricity that is used to charge EVs in need of battery charging. Such ridesharing services may be called to provide not only basic point-to-point transportation for hire but also on-location EV charging via their rideshare vehicles and/or onboard portable power system. It is anticipated that more current generations of electric vehicles will be designed such that their onboard batteries could be used to dispense electricity to charge other EVs thereby expanding the pool of roving mobile chargers or charging stations. Such EVs which are enabled to tap the energy in their onboard primary propulsion battery to provide electricity to another EV may also then be utilized as a mobile power provider 110. With the advent of autonomous vehicle technology such electric vehicles may be remotely summoned to rendezvous with requesting EV drivers for charging services.

The mobile power providers 110 associated with electric vehicles will have identified electric vehicle supply equipment (EVSE), commonly known as an EV charger of various voltages and current designations such as a level II or level III charger and are equipped with standard electricity dispensing nozzles such as an SAE J1772 for a type one single phase AC charging plug, a type two triple-phase AC plug and for direct current (DC) there are CCS, CHAdeMO and NACS (as defined by tesla). Such electric vehicle supply equipment (EVSE) may have built-in intelligence and remote communications capability or equipped with adapters with such intelligence and remote communications capability and may be remotely controlled by their owners and/or designated operators.

The peer-to-peer mobile charging service server 104 not only provides matching of stranded EV drivers in need of battery charging with ridesharing services that are equipped to provide battery charging services but also with individual operators that may operate a mobile transport platform equipped to provide a multitude of services such as refreshments as offered by food trucks. Thus, the peer-to-peer network 102 matches individuals that operate EVs that need a charge with a rideshare vehicle that is equipped to provide recharging with a portable power pack which is an example of a "need and provider" pair. Another example of a need and provider match could be two EV drivers that are normally providing charging services as MPPs 110 and the one MPP 110 that needs charging is serviced by the other MPP 110 with excess power. A further example would be between a driver of a hydrogen power vehicle and a mobile hydrogen gas provider.

The peer-to-peer mobile charging server 104 comprises both hardware modules 106 and software 108 under the control of one or more computers with or without artificial intelligence (AI) capabilities subject to human override and/or management. The peer-to-peer mobile charging service server 104 provides matching electric/electronic devices 112, electric vehicles 114 and mobile power providers 110 not only with other mobile service providers that are equipped to provide compatible battery charging services but also with individual operators that may operate a mobile transport platform equipped to provide a multitude of services such as refreshments as offered by food trucks. The peer-to-peer mobile charging service server 104 connects with a number of network devices that include electric/electronic devices 112 and electric vehicles 114. These may comprise electric and electric/electronic devices such as laptop computers, tablets, mobile phones, portable oxygen breathing equipment, electric wheelchairs, electric scooters, elects cases words or any other portable electrically powered device. The network devices may also comprise electric vehicles 114 that need to be recharged.

The manually driven electric vehicles 114 are registered with the peer-to-peer mobile charging service server 104 as a network device that is associated with a particular driver using a smart communication device that is under control of the driver. The smart device connects remotely to the server 104 through the cloud to enable communications between the server and the smart devices. The electric vehicles 114 may also be equipped with AI to perform the charging operations. The network devices also include mobile power providers 110 that include portable batteries, transportable battery packs, portable generators such as portable wind or solar generators or any other portable electric power producing device. Each of the network devices are registered with the peer-to-peer mobile charging service server 104 that communicates with the network devices over a cloud network 113, such as the Internet, that enables communications between the peer-to-peer mobile charging service server 104 and each network device that is interconnected with each other through the cloud network 113 over a network interface 115.

The network devices 112 or 114 require the use of a smart communication device (smart device) that is under control of the device user or may itself be a smart device. The smart device is connected remotely to the cloud network 113 for communications with server 104. The smart devices include smart phones, smart tablets, computers, smart watches or other communication devices that may be running in automated mode under one or more software programs which may be classified as AI or operated manually by a user through application 116.

Power devices as associated with their respective mobile power providers 110 enable the power devices power capacity and/or generation capability to be periodically monitored. Smart power outlets such as ordinary electrical outlets that are controlled remotely via a cloud to provide access to a power source on demand or by reservation, and EVSEs with associated communications capabilities may also be monitored and utilized to provide charging.

Various electronic service providers such as banks and payment service providers using bit coin and/or other payment media and even automated teller machines may be in communication with the peer-to-peer mobile charging service server 104.

The system devices such as the electric/electronic device 112 electric vehicle 114 and MPP 110 may also have included therewith an application 116 which runs on the previously mentioned smart devices in order to provide communications between these components and the peer-to-peer mobile electric charging service server 104 to provide financial services.

The MPP 110 also uses an application 116 to register their service offering(s) with the peer-to-peer mobile charging network 102 and subsequently to log-in to the server 104 when they are ready to provide service. Thus, the MPP 110 are themselves subscribers to the system 102 and they elect to offer services as an MPP 110 as they desire. Ideally the AI within the server 104 automatically designates any subscriber as an MPP 110 or a service requestor through application 116 which continuously monitors the state of the particular devices' power levels and indicates the application 116 user's device as available to function as an MPP 110. Subscribers to system 102 can all be service providers depending on their devices' power levels.

The peer-to-peer mobile service charging service server 104 and associated components encompass various technologies such as the Internet, cloud computing environment, wireless, remote, in-line, near-field and transponder communications, power transmission protocols, power delivery and measurement, database techniques and technologies, the electricity grid, alternate power conveyance grids, Internet of Things (IOT) protocols and methods and mechanized transportation platforms to enable and provide for range of services to a device user. The device users may be required to pay a subscription fee for the privilege of engaging other device users or mobile provider platforms to either provide services or to receive services from other subscribers' system. Users are able to register with the system utilizing the application 116 wherein the subscribers to the peer-to-peer mobile charging service server 104 are required to register their identity and other information and may be required to pay a subscription fee for membership and/or use of the associated system services. The application 116 is used by system users to obtain battery charging services for an electric/electronic device 112 or electric vehicle 114 at a predetermined location and which service will be matched with a corresponding registered mobile power provider 110 that is registered on the peer-to-peer mobile charging service server 104. It is anticipated that newer generations of electric vehicles 114 will be designed such that their onboard batteries could be used to dispense electricity to charge other similar electric vehicles which could be used to expand the pool of roaming mobile power providers 110 such that the electric vehicles would act both as a charging source and charge user.

Figure 2:
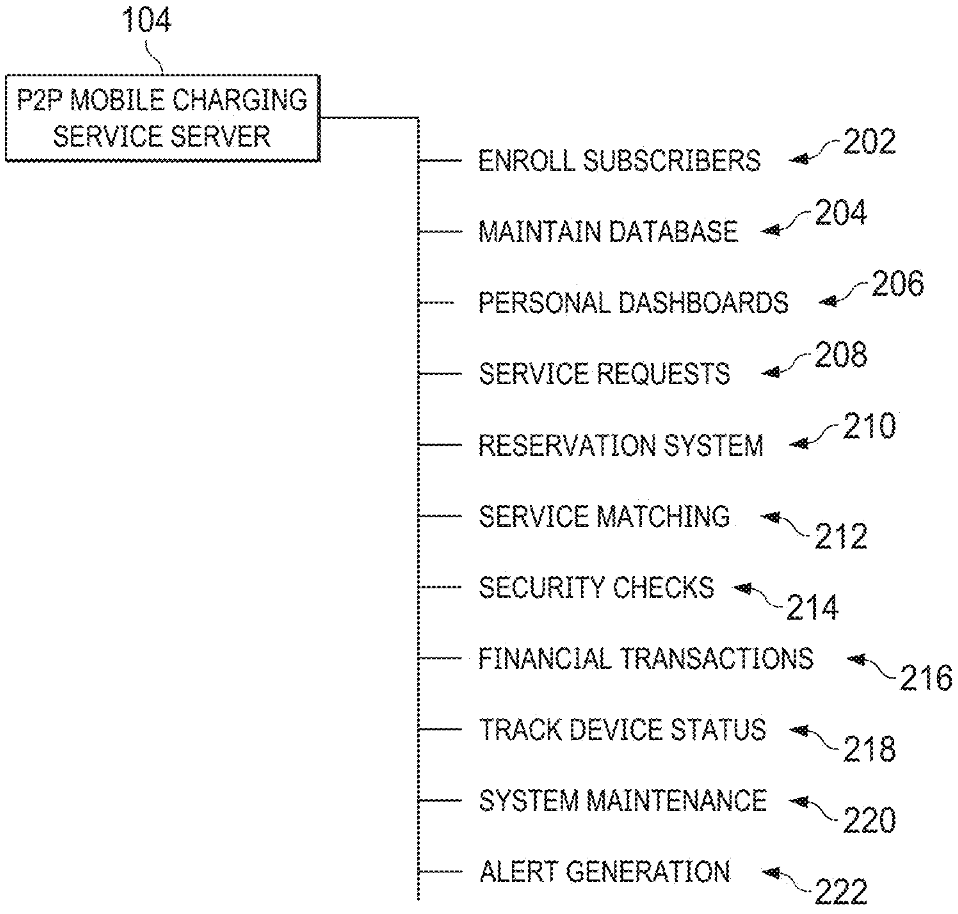
FIG. 2 illustrates a subscriber record for the peer-to-peer mobile charging service network.
Figure 3:
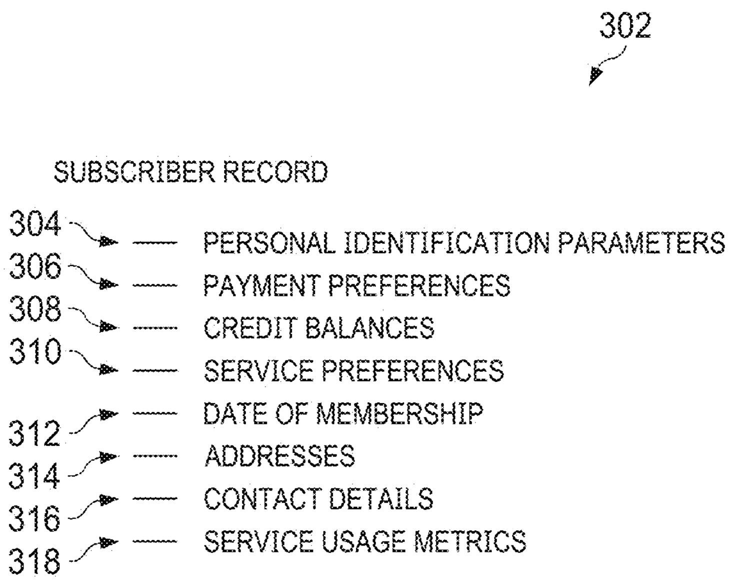
FIG. 3 illustrates the various operations performable by the peer-to-peer mobile charging service network.

Referring now to FIG. 2, there is illustrated a variety of functionalities provided by the peer-to-peer mobile charging service server 104. The server 104 enables subscribers to be enrolled 202 with the system. Such enrollment may incorporate the use of artificial intelligence (AI) to facilitate the process of capturing the subscriber's personal and associated data such as residential address and biometric data for identification verification later when the subscriber logs in to use the application 116 to access the system 102. The server 104 maintains an active database 109 (FIG. 1) that dynamically records and purges information relating to the subscribers. An example of a subscriber record 302 is illustrated in FIG. 3. The subscriber record 302 includes personal identification parameters 304 such as name, login credentials, gender, birthday and any other relevant subscriber identification or biometric information. Payment preferences 306 comprise credit card or bank account information enabling the payment of charging services with respect to devices or vehicles. Credit balances 308 indicate available balances for prepaid charging services that may have been allocated to the subscriber. Service preferences or offerings 310 describe information relating to the particular type of charging services or other types of services preferred by a subscriber. The date of membership 312 indicates the date that the subscriber joined the peer-to-peer mobile charging service network. Addresses 314 provide the contact addresses provided by the subscriber for various purposes as necessary or desired and may even not be restricted to any particular geography. Finally, the contact details 316 indicate preferred modes of contacts for the subscriber. Service usage metrics 318 track and records subscriber access to peer-to-peer mobile charging network 102 and associated services utilized so as to provide further real-time system responses or regular or ad hoc marketing promotion and rewarding activities. It will be appreciated that the above identified user record parameters are merely illustrative and other types of subscriber record information may be included within the subscriber record 302.

Referring now back to FIG. 2, the peer-to-peer mobile charging service network server 104 provides a personal dashboard 206 for subscribers and application 116 users to manage certain categories of their personal profile within the subscriber records 302 and interact with system 102. The services provided by the dashboard 206 enable subscribers and application 116 users to view and manage certain parameters of their subscriber/user record. Subscribers may deposit and maintain payment credits in their accounts to be used to purchase services from other network subscribers and change subscriber information. The peer-to-peer mobile charging service server 104 processes service request 208 from subscribers and service providers in need of on-site recharging of their electric/electronic device 112 or electric vehicle 114. The charging services are provided via a mobile power provider 110 that may be equipped with a battery charger, portable generator or other means of providing electrical power. Through the dashboard 206 the subscriber that needs charging will have the ability to preset their preferences as to whether to let MPPs 110 automatically accept a charge request or set the application 116 to a subscriber MPP selection option.

The peer-to-peer mobile charging network service server 104 provides operation and maintenance of a reservation system 210 that enables subscribers to determine mobile power provider 110 availability by requesting subscribers for specific dates/times that the mobile power provider 110 is available. Working with the reservation system 210 are service matching functionalities 212 that match requesting subscribers with a corresponding service available from at least one mobile power provider 110 having available matching services be it for power or otherwise. The service matching 212 utilizes AI to analyze matching characteristics to ensure optimal matching that considers factors such as time for service availability, time for service duration, travel distance required, cost of service, service expectations, historical outcomes, probabilities for successful service engagement, etc.

The peer-to-peer mobile charging service server 104 also performs security checks 214 on each transaction/request from a subscriber to ensure that the respective subscriber accounts have not been compromised and that the requests are being performed by authorized parties. The peer-to-peer mobile charging service network also manages financial transactions 216 between requesting subscribers and mobile power providers 110 including financial debits and credits between associated parties in maintaining historical records of subscriber transactions. The records may be utilized for auditing purposes if necessary. The peer-to-peer mobile charging service server 104 also regularly interacts with the subscribers to track device status 218 for both charge receiving devices and charge providing devices. This enables the server 104 to keep track of the subscriber device status such as whether it is active or idle, its service capacity and ability to provide charging services. The peer-to-peer mobile charging service network 104 also performs the scheduled system maintenance 220 or initiates system maintenance interventions as necessary.

The peer-to-peer mobile charging service server 104 also enables alert generation 222. The subscriber to the network registers their devices with the server in order that the devices may maintain regular wireless connectivity with the peer-to-peer mobile charging service server 104. This may require importing an application 116 to reside and operate on their electrical/electronic device 112 or electric vehicle 114. The application 116 enables the subscriber to contact the peer-to-peer mobile charging service server 104 to request a meeting with an MPP 110 that will provide charging and/or other services. The application also enables the setting up of reservations with an MPP 110 by interactions with the server 104. The application 116 can provide for the user to register and log in to the peer-to-peer mobile charging service via interactions with the server 104. The registration process may use third party apps such as Facebook as the login mechanism. The application 116 may also provide for registration of a subscriber electronic device 112 or electric vehicle 114 to enable power status monitoring. The application 116 also enables the subscriber to access the dashboard to review the subscriber's account. The system incorporates AI which communicates with the subscriber device and monitors the power levels in the device and generates alerts to subscribers when recharging of the respective devices are required. The alert will also provide appropriate charging sources that are available for recharging the device. When such charging services have the capability of being reserved, the AI may initiate reservation of such service sources. The subscriber may control the trigger levels and conditions for such alerts and reservations as desired.

Figure 4:
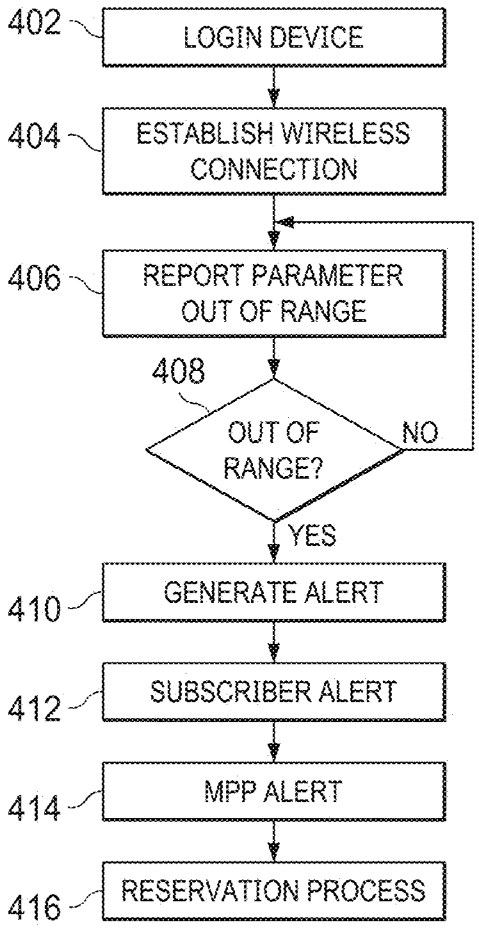
FIG. 4 illustrates a flow diagram of a process for generating alerts and reservations for electric/electric/electronic devices and electric vehicles using the peer-to-peer mobile charging service network.

Referring now to FIG. 4, there is illustrated a flow diagram of the operation of the alert generation process. The subscriber initially logs-in their devices at step 402 so that their devices are connected to the peer-to-peer mobile charging network server 102 and such devices' connection to network 102 may be regulated by the subscriber via application 116 so that the logins may be scheduled and automatically performed at the subscriber's discretion. As discussed previously, the device may comprise any electrical/electronic device or electric vehicle. Each of the subscriber's devices then establishes a wireless connection between the device and the peer-to-peer mobile charging service server 104. Via the wireless connection the device may then report out of range parameters at 406 to the peer-to-peer mobile charging service server 104. The server 104 determines whether an out of range parameter exists for the device at inquiry step 408 which level is preset by the subscriber via application 116. If not, control passes back to step 406 where the out of range parameter is further monitored. If inquiry step 408 determines that the out of range parameter of the device exists, control passes to step 410 wherein the peer-to-peer mobile charging service server 104 generates alerts and transmit this alert to the device at step 412. The system may also issue alerts at step 414 to nearby mobile power providers (MPP) 110 when a subscriber's device is in need of a charge (which charge status the server 102 is continuously monitoring) so that the MPPs 110 can respond with interest or accept the charge request. Along with the alert, the server 104 may initiate a reservation process at 414 to enable the device to establish a reservation with a mobile power provider 110 according to protocols set by the subscriber such as proximity to and the service available from the provider 110. The reservation can be with a subscriber selected MPP 110 or an MPP 110 that responded to the alert notification from the server 102. Such protocols may include assessing alternative fixed charging sources as described in U.S. patent application Ser. No. 18/443,617, filed Feb. 16, 2024, entitled A UNIVERSAL AUTOMATED SYSTEM FOR IDENTIFYING, REGISTERING AND VERIFYING THE EXISTENCE, LOCATION AND CHARACTERISTICS OF ELECTRIC AND OTHER POWER OUTLETS BY RANDOM USERS AND FOR RETRIEVAL AND UTILIZATION OF SUCH PARAMETRIC DATA AND OUTLETS BY ALL USERS, the specification of which is incorporated by reference herein in its entirety.

Out of range parameters may comprise any number of items such as a charge level of an electric/electronic device or EV or various parameters including temperature, responsiveness, capacity, number of instances of interruptions and incomplete operations. All those parameters would have some relevance and needs monitoring with respect to the electric/electronic device or EV.

As mentioned previously, the above described peer-to-peer mobile charging service server 104 may also be used for establishing charging connections for electric vehicles 114. The server 104 provides a network for rapidly scaling up the availability of emergency electric vehicle (EV) charging services by networking existing emergency roadside assistance organizations or individuals and even enabling other service organizations that operate ridesharing services such as Uber, Lyft and GRAB (collectively referred to as ridesharing services) to participate in the provision of emergency roadside assistance services. In these implementations, the ridesharing service or individual providing the on-location battery charging services would be equipped with portable or transportable battery packs or derivative power from the ridesharing service vehicle itself. Such service vehicles can then provide mobile charging services to EV drivers in need of a charge. Any individual with a transportable battery pack may become a roving EV charge provider by registering with the peer-to-peer mobile charging service server 104. Which incorporates the operating hardware and software systems described hereinabove. In turn, such electric vehicle charge providers may at times need receipt of a charge themselves. As described for electrical devices, the server 104 facilitates the matching between EV drivers in need of charging, or other services, with other EV drivers that provide the needed charge or service.

It will be appreciated by those skilled in the art having the benefit of this disclosure that this peer-to-peer mobile charging service network provides a network for enabling on the go charging of electric and electric/electronic devices and electric vehicles. It should be understood that the drawings and detailed description herein are to be regarded in an illustrative rather than a restrictive manner, and are not intended to be limiting to the particular forms, electric energy medium and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing peer-to-peer mobile charging services, comprising:

a database for storing subscriber data relating to subscribers registered with the system and mobile power platform data relating to register mobile power platforms for energizing electrical/electronic devices;

a server for providing a peer-to-peer mobile charging services system, wherein the server is configured to:

receive a request for a service from a subscriber;

select a registered mobile power platform to match with the subscriber using the peer-to-peer mobile charging services system responsive to receipt of the request from the subscriber;

transmit data regarding the selected registered mobile power platform to the subscriber; and a network interface for connecting the server to a network for receiving the mobile power platform data and the request for service.

2. The system of claim 1, wherein the electrical/electronic devices are devices that derive their operating power from batteries.

3. The system of claim 1, wherein the electrical devices comprise electric vehicles.

4. The system of claim 1, wherein the server is further configured to:

receive a second request from the subscriber to enroll with the peer-to-peer mobile charging services system;

receive a third request from the mobile power platform to enroll with the peer-to-peer mobile charging services system;

enroll the subscriber with the peer-to-peer mobile charging services system;

store subscriber data associated with the subscriber within the database responsive to enrolling of the subscriber;

enroll the mobile power platform with the peer-to-peer mobile charging services system; and store mobile power platform data associated with the subscriber within the database responsive to enrolling of the mobile power platform.

5. The system of claim 1, wherein the server is further configured to:

transmit reservation options to the subscriber for a plurality of selected registered mobile power platforms responsive to at least one of predetermined protocols of the subscriber, instructions from a system administrator or an artificial intelligence (AI) unit associated with the server;

receiving a reservation message from a subscriber responsive to the transmitted reservation options; and generating a reservation for the subscriber with a selected registered mobile power platform responsive to the reservation request.

6. The system of claim 1, wherein the server is further configured to perform a security check on the request for service to confirm that the subscriber has not been compromised.

7. The system of claim 1, wherein the server is further configured to enable financial transactions between the subscriber and the mobile power platform to pay for the request for service, between the server, the subscriber and between the server and the mobile power platform and between the server and an operator of the peer-to-peer mobile charging services system.

8. The system of claim 1, wherein the server is further configured to track a status of operations of an electrical/electronic device associated with the subscriber.

9. The system of claim 8, wherein the status comprises an active or idle state parameter, temperature, responsiveness of the device, a service capacity, and a transaction history of the electrical/electronic device including instances of transmission interrupts or incomplete operations.

10. The system of claim 1 further comprising an application associated with an electrical/electronic device in wireless communication with the server via the network interface, wherein the application further generates the request for service responsive to inputs from the subscriber.

11. The system of claim 1, wherein the server is further configured to:

register an electrical/electronic device with the peer-to-peer mobile charging services system responsive to registration data received from the subscriber;

establish a wireless connection with the electrical/electronic device;

detect an out-of-range parameter within the electrical/electronic device;

generate at least one alert to the electrical/electronic device responsive to the detections; and transmit the at least one alert to the electrical/electronic device via the network interface.

12. The system of claim 11, wherein the server is further configured to initiate a reservation process responsive to a detected low power level.

13. The system of claim 11, wherein the server is further configured to initiate a reservation process responsive to an out of range parameters.

14. The system of claim 1, wherein the mobile power platform may comprise any portable power device.

15. The system of claim 1, wherein the service may further include the provision of food and refreshments.

16. The system of claim 1, wherein the service may further include providing technical support to the electrical/electronic devices.

17. The system of claim 1, wherein the mobile power platform may comprise ride sharing services providing a vehicle with an onboard portable charging system.

18. The system of claim 1, wherein the server utilizes AI to select the mobile power platform to match with the subscriber.

19. The system of claim 1, wherein the server provides for communications between a dashboard of the subscriber and the mobile power platform.

20. A method for providing peer-to-peer mobile charging services, comprising:

storing subscriber data relating to subscribers registered with a peer-to-peer mobile charging services system and mobile power platform data relating to registered mobile power platforms for energizing electrical/electronic devices within a database;

receiving at a server a request for service from a subscriber;

selecting at the server a plurality of registered mobile power platforms to match with the subscriber using the peer-to-peer mobile charging services system responsive to receipt of the request from the subscriber;

transmitting, from the server, data regarding the plurality of selected registered mobile power platforms to the subscriber; and connecting the server to a network to receive mobile power platform data and the request for service using a network interface.

21. The method of claim 20, wherein the electrical/electronic devices are devices that derive their operating power from batteries.

22. The method of claim 20, wherein the electrical devices comprise electric vehicles.

23. The method of claim 20 further comprising:

receiving a second request at the server from the subscriber to enroll with the peer-to-peer mobile charging services system;

receiving a third request at the server from the mobile power platform to enroll with the peer-to-peer mobile charging services system;

enrolling the subscriber at the server with the peer-to-peer mobile charging services system;

storing the subscriber data at the server associated with the subscriber within the database responsive to enrolling of the subscriber;

enrolling the mobile power platform at the server with the peer-to-peer mobile charging services system; and storing mobile power platform data at the server associated with the subscriber within the database responsive to enrolling of the mobile power platform.

24. The method of claim 20 further comprising:

transmit reservation options to the subscriber for the selected registered mobile power platform from the server;

receiving at the server a reservation request from the subscriber responsive to the transmitted reservation options; and generating a reservation at the server for the subscriber with the selected registered mobile power platform responsive to the reservation request.

25. The method of claim 20 further comprising a security check on the request for service to confirm that the subscriber has not been compromised at the server.

26. The method of claim 20 further comprising providing financial transactions using the server between the subscriber and the mobile power platform to pay for the request for service, between the server and the subscriber and between the server and the mobile power platform and between the server and the peer-to-peer mobile charging services system.

27. The method of claim 20 further comprising tracking using the server a status of operation of an electrical/electronic device associated with the subscriber.

28. The method of claim 27, wherein the status comprises an active or idle state parameter, temperature, responsiveness of the device, a service capacity, and a transaction history of the electrical/electronic device including instances of transmission interrupts and incomplete operations.

29. The method of claim 20 further comprising generating the request for service responsive to input from the subscriber using an application associated with an electrical/electronic device in wireless communication with the server via the network interface.

30. The method of claim 20 further comprising:

registering an electrical/electronic device with the peer-to-peer mobile charging services system responsive to registration data received from the subscriber at the server;

establishing a wireless connection with the electrical/electronic device from the server;

detecting a low power level within the electrical/electronic device by the server;

generating an alert to the electrical/electronic device responsive to the detected low power level at the server; and transmitting the alert to the electrical/electronic device from the server via the network interface.

31. The method of claim 30 further comprising initiating a reservation process responsive to the detected low power level from the server.

32. The method of claim 30, wherein the server is further configured to initiate a reservation process responsive to an out of range parameter.

33. A system for providing peer-to-peer mobile charging services, comprising:

a database for storing subscriber data relating to subscribers registered with the system and mobile power platform data relating to register mobile power platforms for energizing electrical/electronic devices;

a network interface for connecting to a network for receiving and transmitting data;

a server for providing a peer-to-peer mobile charging services system, wherein the server is configured to:

register an electrical/electronic device with the peer-to-peer mobile charging services system responsive to registration data received from a subscriber;

establish a wireless connection with the electrical/electronic device;

detect a low power level within the electrical/electronic device;

generate an alert to the electrical/electronic device responsive to the detected low power level;

transmit the alert to the electrical/electronic device via the network interface;

select a registered mobile power platform to match with the subscriber using the peer-to-peer mobile charging services system responsive to the generated alert;

initiate a reservation process for the selected registered mobile power platform responsive to the generated alert; and transmit data regarding the reservation process for the selected registered mobile power platform to the subscriber.

34. The system of claim 33, wherein the electrical/electronic devices are devices that derive their operating power from batteries.

35. The system of claim 33, wherein the electrical devices comprise electric vehicles.

36. The system of claim 33, wherein the server is further configured to:

transmit reservation options to the subscriber for the selected registered mobile power platform;

receiving a reservation request from the subscriber responsive to the transmitted reservation options; and generating a reservation for the subscriber with the selected register mobile power platform responsive to the registration request.

37. The system of claim 36, wherein the server is further configured to perform a security check on the reservation request to confirm that the subscriber has not been compromised.

38. The system of claim 33, wherein the server is further configured to enable financial transactions between the subscriber and the mobile power platform t, between the server and the subscriber and between the server and the mobile power platform and between the server and an operator of the peer-to-peer mobile charging services system.

39. The system of claim 33 further comprising an application associated with an electrical/electronic device in wireless communication with the server via the network interface, wherein the application further generates the reservation request for service responsive to input from the subscriber.

* * * * *